CARL CONNALLY, JR.
INVENTOR.

BY H. Matthews Garland
ATTORNEY

CARL CONNALLY, JR.
INVENTOR.

3,123,140
METHOD OF REDUCING GAS CONING AROUND A PRODUCING WELL
Carl Connally, Jr., Dallas, Tex., assignor to Socony Mobil Oil Company, Inc., a corporation of New York
Filed Mar. 27, 1961, Ser. No. 98,671
12 Claims. (Cl. 166—42)

This invention relates to a method of producing oil from a subterranean earth formation. Specifically, this invention relates to a method of producing oil wherein gas coning around a production well is reduced in a subterranean reservoir comprising an upper gas-containing formation and a lower oil-containing formation.

Often a hydrocarbon fluid reservoir will be found wherein the hydrocarbon fluids contained within the reservoir will exist in stratified conditions such that there will be an upper portion of the formation which will be substantially gas-saturated overlying a lower portion of the formation which will be substantially oil-saturated. Where such a condition exists within a reservoir, a well drilled into the reservoir for the purpose of producing oil will, of course, penetrate through the gas-containing upper portion of the formation into the oil-containing lower portion of the formation. When oil is produced from such a well, there exists a tendency toward the development of a situation most frequently referred to as "gas coning" which results not only in the by-passing of large quantities of oil, but also causes the production of large quantities of gas which may necessitate shutting down the well due to uneconomically high gas-oil ratios in the fluids flowing from the production well.

Various methods have been proposed for the purpose of reducing the gas-oil ratio of the fluids withdrawn from a reservoir having a gas-containing zone overlying an oil-containing zone. One such method comprises the injecting of a plugging material into the strata between the oil-containing zone and the gas-containing zone in order to deter the migration of the gas downwardly into the oil zone. While such a method may provide a temporary remedy, it is not effective for the production life of a well due apparently to the fact that it is difficult, if not impossible, to inject the plugging material a sufficient distance into a formation from a production well to establish an effective and reasonably permanent barrier between the gas- and oil-containing zones. Another method of coping with the problem which has been suggested is the injection of a petroleum oil directly into the gas-containing zone. This method is, at best, only a partial solution to the problem in view of the problems of miscibility between the gas and the injected petroleum oil which result in incomplete displacement of the gas in the gas-containing zone away from the production well. When production operations are resumed, gas saturation rapidly increases by expansion of the residual gas and release of gas from solution. Permeability of the formation to gas is rapidly re-established, resulting in the redevelopment of unsatisfactorily high gas-oil ratios.

It is one object of the present invention to produce oil from a reservoir which comprises a gas-containing zone above an oil-containing zone. It is another object of the present invention to produce oil from a reservoir comprising a gas-containing formation overlying an oil-containing formation in such a manner that a minimum amount of gas is produced along with the oil. A further object of the present invention is to produce oil from such a formation in a manner which will prevent gas coning around the production well. These and other objects of the invention will be apparent from a reading of the following description, taken in conjunction with the accompanying drawings.

In accordance with the present invention, a reservoir comprising an upper gas-containing formation and a lower oil-containing formation is produced by a method which comprises the steps of introducing a first fluid comprising liquefied, normally gaseous hydrocarbon material into the upper gas-containing formation to displace gas from the portion of the formation immediately around the production well, injecting a second fluid comprising a low asphalt content petroleum oil or an asphalt-free petroleum oil into the gas-containing zone to displace the first fluid further into the formation, and, while simultaneously continuing injecting the second fluid, producing oil from the lower formation through the production well from a level below the point of injection of the first and second fluids.

Figure 1:
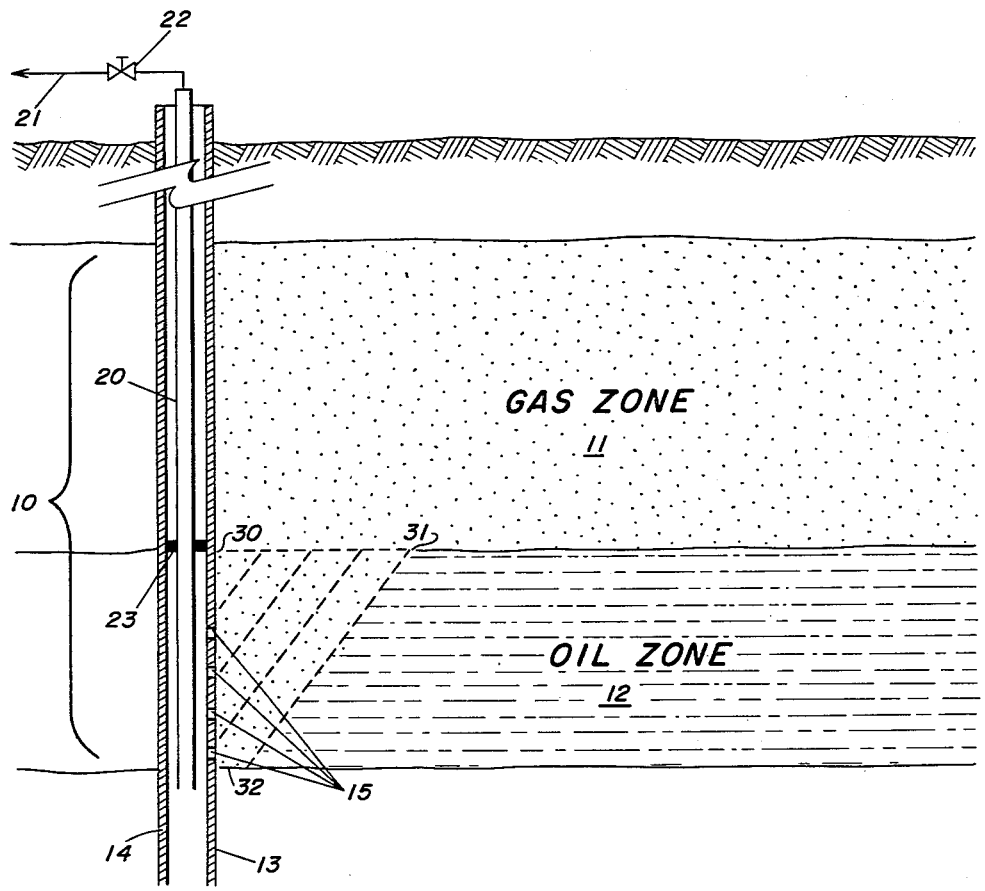
FIGURE 1 is a schematic view in cross section illustrating a production well leading into a reservoir comprising an upper gas-containing zone and a lower oil zone in which a condition of gas coning has developed around the production well.

Referring to FIGURE 1 of the drawings, reservoir 10 comprises an upper gas-containing formation 11 and a lower oil-containing formation 12. Reservoir 10 is penetrated by wellbore 13 which is drilled from the surface into the reservoir and terminates within the reservoir at a location near the bottom of, or below the bottom of, formation 12. As illustrated, wellbore 13 is provided with casing 14 which extends through the lower formation 12 where it is penetrated by a plurality of perforations 15 to permit the flow of oil from the lower formation into the casing. It will be recognized that while the wellbore is cased to the bottom, as illustrated, it is not always required that a wellbore be cased throughout its entire length. Under some conditions it may be necessary to extend the casing 14 only to the top of oil-containing formation 12. These conditions will include the legal requirements for the drilling of the particular well and the rigidity of the material comprising the formation 12. For example, if local legal regulations permit and the walls of the wellbore are sufficiently rigid that they will not crumble into the well during production, it may not be necessary that the well casing extend through the oil-producing zone. Under any conditions, however, it will be recognized that a well will require casing through the upper gas-containing zone 11 in order to prevent direct flow of the gas from formation 11 into the wellbore. While production may be effected through the casing 14, it is generally preferred that a string of tubing 20 be installed in the well extending from the upper end of the well into the vicinity of oil-containing formation 12. A conduit 21 provided with a valve 22 is connected into the upper end of tubing 20. Oil produced from formation 12 flows into the casing through perforations 15 and upwardly through tubing 20. At the upper end or head of the well the oil flows from tubing 20 into conduit 21, with the rate of flow being controlled by valve 22. If it is not desired that the entire length of the casing 14 be subjected to the pressure under which the oil is flowing from formation 12 a packer 23 may be installed around tubing 20 between the tubing and the internal surface of the casing 14 at a point above the perforations 15. Packer 23 may be any conventional form of packer which will effectively provide a seal around the tubing between the tubing and the internal surface of the casing.

As previously indicated, upper formation 11 is gas-saturated, while lower formation 12 is initially oil-saturated, with the production of oil from formation 12 being effected by a combination of forces which include the force of expansion of dissolved gas within the oil in formation 12 and the force of the gas from formation 11 pushing on the oil in formation 12. As the flow of oil from lower formation 12 continues, there is oftentimes a tendency for the gas in upper formation 11 to migrate downwardly within the zone around the casing 14 in the vicinity of perforations 15, resulting in a condition of gas saturation around the casing referred to as "gas coning." A condition of gas coning is illustrated in FIGURE 1 by the zone defined by the reference numerals 30, 31, and 32 which has become gas-saturated by virtue of the downward migration of the gas from upper formation 11. Zone 30, 31, 32 is approximately conical in shape and extends entirely around well 13. As the condition of gas coning progresses, oil flow from lower formation 12 decreases with the gas-to-oil ratio of the fluids flowing from the well through tubing 20 steadily increasing. If this condition is permitted to persist, the well will reach a low oil rate and a high gas-oil ratio at which it will no longer be economically feasible to produce the well. The purpose of the present invention is to provide a method of producing oil whereby this tendency toward gas coning may be minimized, if not entirely eliminated.

When a condition of gas coning, as above described, has developed to the point where it is no longer economical to produce a well, the method of the present invention may be inaugurated. A gas-to-oil ratio which is generally considered to be an economical upper limit is 10,000 to 25,000 cubic feet of gas per barrel of oil. Generally, the preferred upper limit of gas-to-oil ratio is about 15,000 cubic feet of gas per barrel of oil. When it is determined that a well has reached its upper economical gas-to-oil ratio, production from the well is suspended or, in other words, the well is shut-in, and the well is then equipped in the manner illustrated in FIGURE 2 of the drawings in order to permit application of the method of the invention. If a packer, such as diagrammatically illustrated by reference numeral 23 in FIGURE 1, has not already been installed within the well, it is necessary that such a packer be placed in the well around tubing 20 within casing 14 above the perforations 15 at approximately the boundary between the upper formation 11 and lower formation 12. Casing 14 is then perforated, as illustrated by reference numerals 33 in FIGURE 2, into upper formation 11. It will be recognized that upon perforation of the casing into the upper formation 11, the casing will be subjected to the pressure of the gas within the formation 11. If it is not desired that the entire length of the casing from the packer 23 to the upper end or surface end of the well be subjected to gas pressure, a packer 34 may be installed within casing 14 around tubing 20 at the upper boundary of formation 11 above the perforations 33. A line or conduit 35 is then installed in the well extending into the casing to the vicinity of the upper perforations 33. On the surface, conduit 35 is connected to a pump 40 which in turn is connected to a conduit 41 extending from the pump to a storage facility 42 which contains a liquefied, normally gaseous hydrocarbon material which is miscible with the gas in formation 11. Conduit 41 is provided with a valve 43 to control flow of fluids from storage facility 42 through conduit 41 to pump 40. Extending from conduit 41 at a point between pump 40 and valve 43 is a conduit 44 connected into a storage facility 45 containing a petroleum oil which is miscible with the hydrocarbon material in storage facility 42. Conduit 44 is provided with a valve 50 to control the flow of petroleum oil between storage facility 45 and conduit 41. Storage facility 45 is also connected by a conduit 51 to a pump 52. Pump 52 is connected by conduit 53 to conduit 21 through which production from well 13 flows. Conduit 53 is provided with a valve 54 to control the flow of produced gas and oil into conduit 53 from conduit 21. For reasons which will be explained hereinafter, a portion of the production from the well may be circulated to the storage facility 45 by means of the previously described apparatus. With a well equipped as described, fluids from storage facilities 42 and 45 in addition to fluids produced from the well may be injected through conduit 35 into upper formation 11 between packers 23 and 34. The fluids flow from the casing through the perforations 33 into upper formation 11.

Subsequent to suspension of production when the gas-oil ratio flowing from the well has approached the range of 10,000 to 25,000 cubic feet of gas per barrel of oil, preferably about 15,000 cubic feet of gas per barrel of oil, and after the well has been equipped as above described, the further steps of the invention are carried out in the following manner. It will be recognized that since production is suspended, valve 22 in line 21 is closed to prevent the flow of fluids from the well. Valve 50 in line 44 is maintained closed to prevent flow through conduit 44. Storage facility 42 is filled with the liquefied, normally gaseous hydrocarbon material, such as liquefied petroleum gas or propane. Valve 43 in conduit 41 is opened and pump 40 is actuated to initiate flow of the liquefied, normally gaseous hydrocarbon material from storage facility 42 through conduits 41 and 35 into the well within casing 14 between the packers 23 and 34. The hydrocarbon material is delivered by pump 40 through conduit 35 at a pressure sufficient to force the hydrocarbon material from the casing outwardly into the upper formation 11 through perforations 33. The pressure required for injection of the hydrocarbon material into formation 11 will, of course, have to be sufficiently in excess of the pressure within formation 11 to effect displacement of the hydrocarbon material outwardly into the formation from the casing. Injection of the hydrocarbon material is continued until the gas within upper formation 11 is driven outwardly from the well casing through the formation a predetermined distance, which preferably is a distance of at least about 20 feet from the well casing. Due to the miscibility of the hydrocarbon material with the gas within formation 11, the hydrocarbon material will displace the gas outwardly from the well casing through the formation. The time required to effect displacement of the gas radially outwardly from the well casing will, of course, vary with the permeability and the thickness of upper formation 11. When a sufficient quantity of hydrocarbon material has been injected into the upper formation to displace the gas within the formation the desired radial distance outwardly from the well casing, injection of the hydrocarbon material is terminated and injection of the petroleum oil contained in storage facility 45 is initiated. This is accomplished by closing valve 43 in conduit 41 and opening valve 50 in line 44 to permit the pump 40 to withdraw the petroleum oil from the storage facility and deliver it into the well casing through the conduit 35. The petroleum oil is then forced into upper formation 11 through perforations 33 in the same manner as the hydrocarbon material was injected into the upper formation. Injection of the petroleum oil is continued until the trailing edge of the previously injected hydrocarbon material, the trailing edge being that boundary of the body of hydrocarbon material nearest the wellbore, is a predetermined distance radially from the wellbore, this distance preferably being about 20 feet from the wellbore. Due to the miscibility of the petroleum oil and the hydrocarbon material, the petroleum oil will displace the hydrocarbon material radially outwardly from the wellbore through the formation 11.

The petroleum oil which is injected subsequent to the injection of the liquefied, normally gaseous hydrocarbon material is an oil having a low asphalt content and preferably a substantially asphalt-free oil which is miscible with both the liquefied, normally gaseous hydrocarbon material and with the reservoir oil within the lower formation 12. Also, the oil should be gas-free and of a viscosity higher than the reservoir oil being produced from lower formation 12. The higher viscosity requirement for the petroleum oil is preferred in order to avoid by-passing the gas in upper formation 11 and to minimize flow downwardly into lower formation 12 around perforations 15. If desired, reservoir oil produced from lower formation 12 may be circulated to storage facility 45 and subsequently injected into the upper gas-containing formation 11 in the manner previously described. If such circulation of the reservoir oil is desired, it may be obtained by opening valve 54 in line 53 to permit pump 52 to force the oil through conduit 51 into storage facility 45. If the reservoir oil is employed in the oil-injection stage of the invention, it is thickened in order to raise its viscosity above the level of the reservoir oil within formation 12. A suitable thickener for increasing the viscosity of the produced oil for reinjection may be an oil-soluble resin, such as a semisolid polyethylene, which is added in an amount ranging from 0.01 to 0.5 percent of the quantity of reservoir oil to be reinjected.

Figure 2:
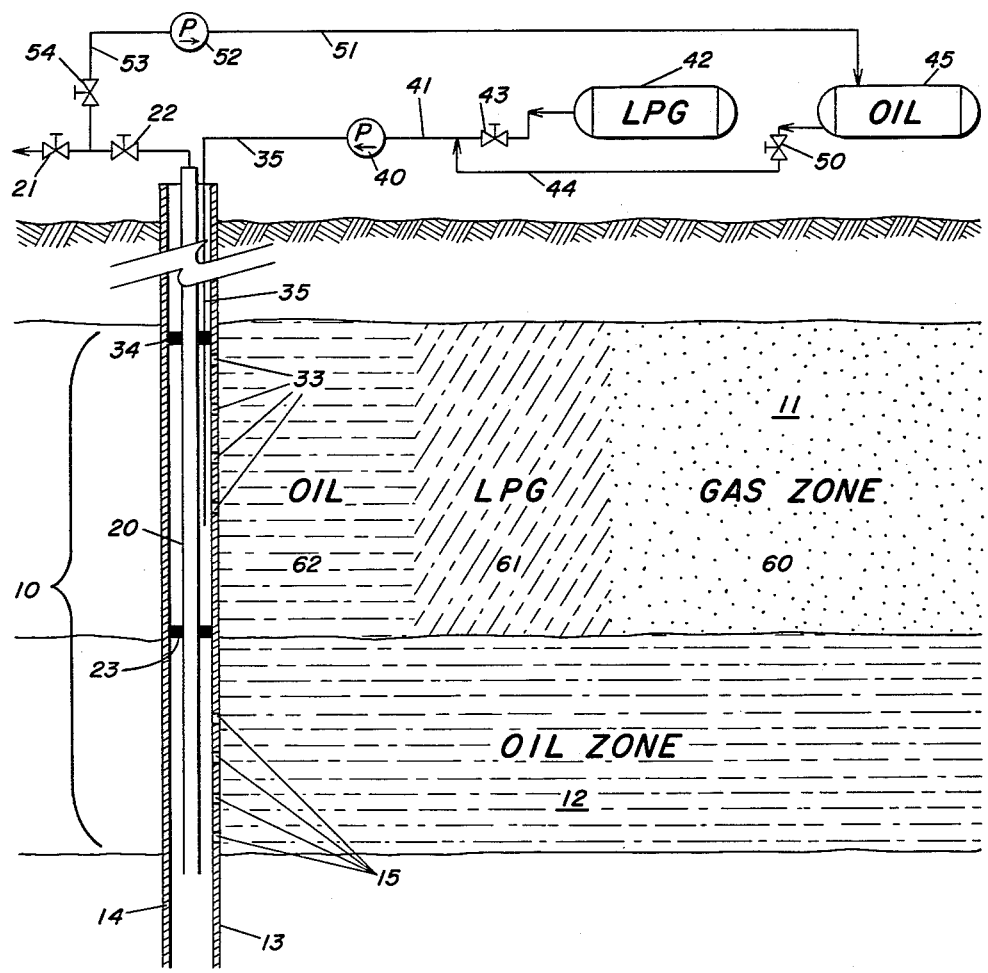
FIGURE 2 is a schematic illustration in cross section similar to FIGURE 1 showing the equipment required for and conditions prevailing in a reservoir subsequent to treatment by the method of the present invention.

The condition which exists in reservoir 10 subsequent to injection of liquefied, normally gaseous hydrocarbon material and petroleum oil is illustrated in FIGURE 2 of the drawings. The gas within upper formation 11 has been displaced radially outwardly from the wellbore such that gas saturation continues to exist within what is referred to as zone 60 of the upper formation. Zone 61 of upper formation 11 is occupied by the liquefied, normally gaseous hydrocarbon material, and zone 62 is occupied by the petroleum oil. The displacement of the gas within the upper formation outwardly from the wellbore, as illustrated, alleviates the tendency of the gas to migrate toward the casing perforations 15 and cause a gas coning condition. Concurrent with the injection of liquefied, normally gaseous hydrocarbon material and petroleum oil into upper formation 11, there occurs some migration of these fluids downwardly into that zone defined by reference numerals 30, 31, and 32 in FIGURE 1 to eliminate the gas cone which previously had developed. This migration of the injected fluids into the gas-coned zone effects an oil-saturated condition in that portion of lower formation 12 which previously was gas-saturated such that the oil within lower zone 12 may flow into casing 14 through the perforations 15 to re-establish low gas-to-oil ratio production from the well.

When the petroleum oil has been injected through perforations 33 into the upper formation 11 in sufficient quantity to drive the liquefied, normally gaseous hydrocarbon material outwardly from the wellbore the desired distance of at least about 20 feet or more from the wellbore, production of oil from lower formation 12 may be re-established. Valve 22 is opened and oil within the lower formation 12 is permitted again to flow through the perforation 15 into the wellbore and from the wellbore through tubing 20 as previously discussed. Simultaneously with the resumption of oil production, the injection of petroleum oil through perforations 33 into the upper formation 11 from the storage facility 45 is continued in order to prevent a reversion of the reservoir to the previously existing condition of gas coning. The continued injection of petroleum oil into the upper formation 11 simultaneously with oil production from the lower formation 12 need not be at the same rate as the oil is being produced from the lower formation. It is only necessary to continue the injection of petroleum oil into the upper formation at a rate which is sufficient to prevent backflow of the body of liquefied, normally gaseous hydrocarbon material and the gas within the upper formation 11 toward the wellbore. By preventing backflow of the gas and hydrocarbon material in the upper formation 11 toward the wellbore, the gas is maintained at a safe distance from the wellbore to prevent reinauguration of the undesirable gas-coning condition. So long as oil production is effected from the reservoir, injection of oil into upper formation 11 is continued at the minimum rate necessary to maintain the gas within the formation at a distance from the wellbore sufficient to prevent the resumption of the condition of gas coning.

Though the application of the method of the invention has been described in terms of a reservoir possessing sufficient native energy to effect flow of oil therefrom, it is to be understood that the invention is also applicable to reservoirs from which it is necessary that the reservoir oil be pumped. In other words, the oil produced from lower formation 12 may be removed from the well by pumping rather than natural flow. In this event, pumping equipment of a conventional type is installed on the well at the surface for the purpose of removing reservoir oil from the well.

While the invention has been described in terms of certain specific embodiments disclosed herein, it is to be understood that other applications will occur to those skilled in the art and it is intended that the invention shall be limited only within the scope of the appended claims.

What is claimed is:

1. In a method of producing oil from a well penetrating a subterranean reservoir comprising an upper gas-saturated formation and a lower oil-saturated formation wherein gas coning is prevented around said well the steps which comprise injecting into said upper formation a first fluid miscible with the gas and oil in said reservoir in an amount and for a time sufficient to displace gas within said upper formation a predetermined distance radially outwardly from said well, injecting into said upper formation behind said first fluid a second fluid miscible with said first fluid in an amount and for a time sufficient to displace said first fluid radially outwardly from said well into said upper formation a predetermined distance, and producing oil from said lower formation through said well.

2. In a method of producing oil from a production well penetrating a reservoir comprising an upper gas-saturated formation overlying a lower oil-saturated formation wherein gas coning is prevented around said well the steps which comprise injecting a first fluid comprising a liquefied normally gaseous hydrocarbon miscible with the gas and oil in said reservoir through said well into said upper formation until the gas in said upper formation is displaced radially outwardly from said well through said upper formation for a distance of at least about 20 feet, injecting a second fluid miscible with said first fluid comprising a substantially asphalt-free petroleum oil through said well into said upper formation until said first fluid is displaced radially outwardly from said well through said upper formation for a distance of at least about 20 feet, and producing oil from said lower formation through said production well.

3. In a method of producing oil from a production well penetrating a reservoir comprising an upper gas-saturated formation overlying a lower oil-saturated formation wherein gas coning is prevented around said production well, said production well being provided with casing having perforations opening into said lower formation, the steps which comprise setting packing means within said casing between said upper formation and said lower formation, perforating said casing above said packing means into said upper formation, injecting a first fluid comprising a liquefied normally gaseous hydrocarbon miscible with the oil and gas in said reservoir into said upper formation to displace gas in said formation radially outwardly from said production well, injecting a second fluid miscible with said first fluid comprising a substantially asphalt-free petroleum oil into said upper formation to displace said first fluid radially outwardly from said production well, and producing oil from said lower formation through said production well.

4. In the method of claim 3 wherein the gas in said upper formation is displaced radially outwardly from said production well by said first fluid for a distance of at least about 20 feet and said first fluid is thereafter displaced radially outwardly from said production well by said second fluid for a distance radially outwardly from said production well of about at least 20 feet.

5. In a method of producing oil from a production well penetrating a reservoir comprising an upper gas-saturated formation overlying a lower oil-saturated formation the steps which comprise suspending the flow of reservoir oil through said well from said lower formation when the gas-to-oil ratio in the fluids flowing from said well has reached an uneconomical upper limit, injecting a first fluid comprising a liquefied normally gaseous hydrocarbon material miscible with the oil and gas in said reservoir into said upper formation to displace gas within said formation radially outwardly from said well through said upper formation, injecting a second fluid miscible with said first fluid comprising a substantially asphalt-free petroleum oil into said upper formation to displace said first fluid radially outwardly from said well through said upper formation, reinitiating the flow of reservoir oil through said well from said lower formation while simultaneously continuing injection of said second fluid into said upper formation at a rate sufficient to maintain said first fluid and said gas in said upper formation a distance radially outward from said production well to prevent the development of a condition of gas coning around said production well in the region of said lower formation.

6. In the method of claim 5 wherein production of reservoir oil from said lower formation is suspended when the gas-to-oil ratio of the fluids being produced from said well is in the range of about 10,000 to 25,000 cubic feet of gas per barrel of reservoir oil produced from said lower formation.

7. In the method of claim 6 wherein said first fluid is injected into said upper formation until the gas within said formation is displaced radially outwardly from said well for a distance of at least about 20 feet and said second fluid is thereafter injected into said upper formation until said first fluid is displaced radially outwardly from said well for a distance through said upper formation of at least about 20 feet.

8. In a method of producing oil through a production well penetrating a reservoir comprising an upper gas-saturated formation overlying a lower oil-saturated formation, said production well having casing provided with perforations leading into said lower formation and a string of production tubing extending downwardly through said well to the vicinity of said perforations leading into said lower formation, the steps which comprise suspending flow of reservoir oil from said lower formation through said well when the gas-to-oil ratio in the fluids produced from said well has reached a predetermined upper limit, establishing packing means between said production tubing and said casing in said well between said upper formation and said lower formation, perforating said casing in said well into said upper formation above said packing means, injecting a first fluid miscible with the oil and gas in said reservoir comprising a liquefied normally gaseous hydrocarbon into said upper formation to displace gas in said upper formation radially outwardly from said well, injecting into said upper formation behind said first fluid a second fluid miscible with said first fluid comprising a substantially asphalt-free petroleum oil to displace said first fluid and said gas radially outwardly from said well through said upper formation, said second fluid having a viscosity greater than the viscosity of said reservoir oil in said lower formation, and re-establishing flow of reservoir oil through said well from said lower formation while simultaneously continuing injection of said second fluid into said upper formation at a rate sufficient to maintain said gas and said first fluid radially outward from said well to prevent the development of a condition of gas coning around said well in the vicinity of said perforations leading into said lower formation.

9. In the method of claim 8 wherein said gas in said upper formation is displaced radially outwardly from said well by said first fluid for a distance of at least about 20 feet and the boundary of said first fluid nearest said well is thereafter displaced radially outwardly from said well by said second fluid for a distance of at least about 20 feet.

10. In the method of claim 8 wherein the said second fluid comprises the reservoir oil produced through said well from said lower formation said reservoir oil being thickened to increase its viscosity above the level of viscosity it possesses while in place within the said lower formation.

11. In the method of claim 10 wherein the viscosity of the said second fluid is increased by the addition thereto of an oil-soluble resin in an amount ranging from 0.01 to 0.5 percent of the quantity of said second fluid injected into said upper formation.

12. In the method of claim 11 wherein the said oil-soluble resin is a semisolid polyethylene.

References Cited in the file of this patent

UNITED STATES PATENTS

| | | |
|---|---|---|
| 2,712,355 | Hoff | July 5, 1955 |
| 2,784,787 | Matthews et al. | Mar. 12, 1957 |
| 2,886,108 | Piety | May 12, 1959 |
| 2,923,356 | Glass et al. | Feb. 2, 1960 |